United States Patent [19]
Hähnle et al.

[11] Patent Number: 5,633,329
[45] Date of Patent: May 27, 1997

[54] PREPARATION OF HIGH MOLECULAR WEIGHT POLYMERS

[75] Inventors: Hans-Joachim Hähnle, Ludwigshafen; Eckhard Neufeld, Limburgerhof; Gunnar Schornick, Neuleiningen; Roland Minges, Grünstadt; Thomas Anstock, Weisenheim; Jürgen Tropsch, Römerberg; Hans-Jürgen Krauss, Mannheim, all of Germany

[73] Assignee: BASF Aktiengesellschaft, Ludwigshafen, Germany

[21] Appl. No.: 591,315

[22] Filed: Jan. 25, 1996

[30] Foreign Application Priority Data

Jan. 31, 1995 [DE] Germany .................. 195 02 939.9

[51] Int. Cl.⁶ .................................................. C08F 2/18
[52] U.S. Cl. .................... 526/64; 526/317.1; 526/329.7
[58] Field of Search ............................. 526/64, 317.1, 526/329.7

[56] References Cited

U.S. PATENT DOCUMENTS 5,081,215  1/1992  Koch et al. .................. 528/125

FOREIGN PATENT DOCUMENTS

| 101893 | 3/1984 | European Pat. Off. . |
|---|---|---|
| 0101893 | 3/1984 | European Pat. Off. . |
| 0374709 | 6/1990 | European Pat. Off. . |
| 1218157 | 6/1966 | Germany . |
| 119354 | 4/1976 | Germany . |
| 05057181 | 8/1993 | Japan . |

*Primary Examiner*—Thomas R. Weber
*Attorney, Agent, or Firm*—Oblon, Spivak, McClelland, Maier & Neustadt, P.C.

[57] ABSTRACT

Process for the preparing high molecular weight polymers by polymerization of water-soluble, monoethylenically unsaturated moonomers and, if desired, crosslinkers, and, if desired, water-insoluble monoethylenically unsaturated monomers, in aqueous solution in the presence of polymerization initiators in a tubular reaction which at the end has a conical taper, the ratio of the diameter of the reactor (D1) to the diameter at the end of the conical taper of the reactor (D2) being from 2:1 to 25:1 and the angle between D1 at the beginning of the conical taper and the inner cone wall being >45° and <90°, and discharge of the gelatinous reaction mixture from the reactor by injection of an inert gas.

7 Claims, 1 Drawing Sheet

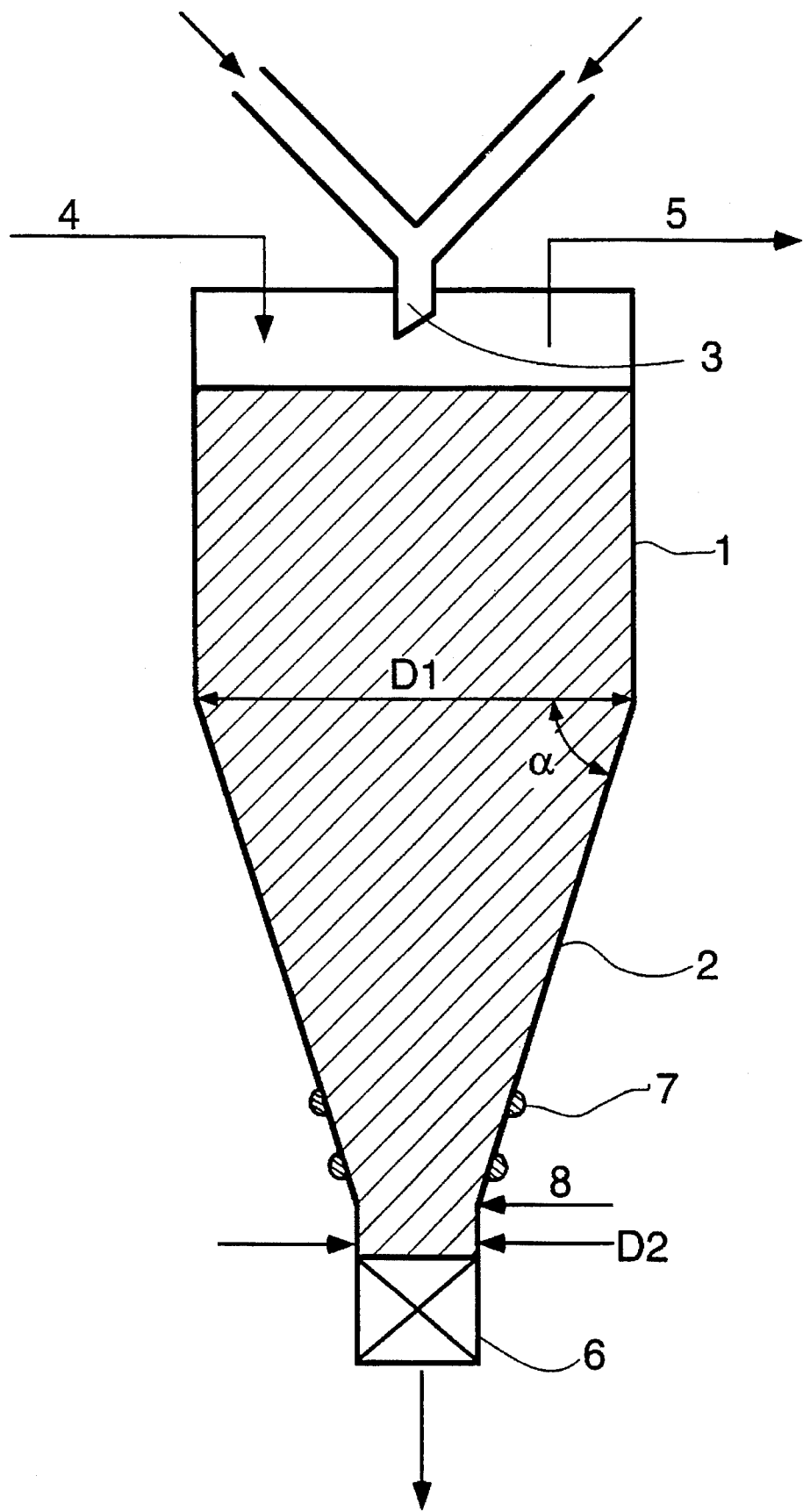

PREPARATION OF HIGH MOLECULAR WEIGHT POLYMERS

The invention relates to a process for preparing high molecular weight polymers by polymerization of water-soluble, monoethylenically unsaturated monomers and, if desired, crosslinkers which contain at least two nonconjugated, ethylenically unsaturated double bonds in the molecule, and, if desired, water-insoluble monoethylenically unsaturated monomers in aqueous solution in the presence of polymerization initiators in a tubular reactor and removal of the gelatinous reaction mixture from the reactor by injection of an inert gas.

DE-B-12 18 157 discloses a process for preparing water-soluble polymers by polymerization of water-soluble, monoethylenically unsaturated monomers in aqueous solution in the presence of polymerization initiators in a cylindrical reactor which is provided with closable connections. Polymerization takes place batchwise. The resulting gelatinous reaction mixture is discharged from the cylindrical reactor with the aid of a fitted piston which can be moved along the cylinder axis.

JP-A-93/57181 likewise discloses a tubular reactor having a movable piston running against the wall for ejecting the polymer gels obtainable during polymerization. The disadvantage of such tubular reactors equipped with a movable piston can be seen in the high wear which is caused during operation by friction between the inner wall of the reactor and the piston. As the polymer gels are frequently of sticky consistency, as a rule very smooth or else wall surfaces with an adhesion-decreasing coating are needed, which are particularly susceptible to the wear described. Moreover, as indicated in said Japanese application as prior art, it was known to discharge polymer gels from a reactor lined with Teflon by injection of an inert gas such as nitrogen. In this process, however, the inert gas prematurely escapes from the reactor through a gap which is formed between the inner wall of the reactor and the gel before the polymer has been pressed through the outlet opening completely. It is therefore not possible in this way completely to remove the polymer from the reactor.

EP-B 0 374 709 discloses a continuous process for preparing liquid-absorbent, crosslinked, water-insoluble polymers by polymerization of water-soluble monomers in a tubular reactor in the presence of polymerization initiators in aqueous medium to give polymer gels. In this process, a separating liquid which is immiscible with this solution is fed in together with the aqueous monomer solution at the reactor inlet, the separating liquid being automatically distributed between the reactor inner wall and polymer phase during the course of the polymerization and the resulting monomers together with the separating liquid being discharged at the reactor outlet. The polymer can be removed from the reactor, for example, by an increased pressure of an inert gas. The breakthroughs of the monomer mixture occurring through the gelatinous polymer or along the interface between reactor wall and polymer gel are also problematic here again in this process. In the case of a breakthrough of the monomer mixture through the polymer gel, the polymerization must be interrupted and the equipment cleaned. The use of separating agents does reduce the number of breakthroughs through the gel, but is associated with the disadvantage that the separating agent remains in the reaction product.

U.S. Pat. No. 5,081,215 discloses a process for preparing polyether ketones in which the polycondensation is carried out by a two-stage process, the polycondensation being completed in the second stage and the plastic polymer matrix containing included aluminum chloride particles obtainable being discharged from the tubular reactor virtually without residue by injecting an inert gas.

It is an object of the present invention to make available an improved process for preparing high molecular weight polymers which form a polymer gel in aqueous medium.

We have found that this object is achieved by a process for preparing high molecular weight polymers by polymerization of water-soluble, monoethylenically unsaturated monomers and, if desired, crosslinkers which contain at least two nonconjugated, ethylenically unsaturated double bonds in the molecule, and, if desired, water-insoluble monoethylenically unsaturated monomers in aqueous solution in the presence of polymerization initiators in a tubular reactor and removal of the gelatinous reaction mixture from the reactor by injection of an inert gas, if the tubular reactor has a conical taper at the end, the ratio of the diameter of the reactor (D1) to the diameter at the end of the conical taper of the reactor (D2) being from 2:1 to 25:1 and the angle between D1 at the start of the conical taper and the inner cone wall being >45° and <90°. The angle between D1 and the inner cone wall is preferably from 65° to 85°.

BRIEF DESCRIPTION OF THE DRAWING

Polymerization is carried out in a reactor which is shown diagrammatically in the figure. This is essentially a tubular reactor (1) which has a conical taper (2) at the end. Before entry of the reaction mixture to be polymerized, the aqueous monomer solution and the initiator solution, which are customarily prepared and fed to the reactor separately from one another, are mixed (3). Suitable equipment for this purpose is any which is suitable for rapid mixing of low viscosity liquids, eg. static mixers.

The tubular reactor (1) consists essentially of a vertical tube of circular cross-section. The inner cylindrical surface of the tube is preferably lined with a material which is inert and anti-adhesive to the reaction mixture. Polytetrafluoroethylene, for example, is suitable for this purpose. The tube body (1) preferably has a ratio of height:diameter of from 4 to 40 and in particular from 6 to 15. The equipment can be sealed pressure-tight. At the top of the tube body are provided one or more feeds for the reaction mixture and for an inert gas (4). In some cases it can be advantageous to use a mixture of inert gas and solvent for pressing out the gelatinous polymer from the reactor. The solvents can be introduced, for example, through the inert gas line (4) or separately therefrom at the top of the reactor. At the top of the reactor a feed line (5) is additionally present, via which the pressure in the tubular reactor can be reduced. The lower end of the tubular reactor has a conical taper (2). The ratio of the diameter of the reactor (D1) to the diameter at the end of the conical taper of the reactor (D2) is from 2:1 to 25:1 and is preferably in the range from 2:1 to 20:1. A very particularly preferred ratio of D1:D2 is from 3:1 to 15:1. The conical taper of the reactor (2) is such that the angle $\alpha$ between D1 at the start of the conical taper and the inner cone wall is >45° and <90°, preferably from 65° to 85°. For most practical applications the angle $\alpha$ is from 75° to 85°.

The reactor can be surrounded by a jacket such that the reaction mixture situated therein can be heated or cooled from outside. At the end of the conical taper is located a shut-off element (6). To the shut-off element can be attached an outlet tube, which at its free end, if desired, has a further taper whose dimensions are optimized to the distribution of the gel to be discharged. At the end of the cone is located an arrangement for radioactive level measurement (7), and at least one connection (8) through which inert gas can additionally be introduced into the reactor. Instead of a single feed line (8), it can be advantageous if a multiplicity of openings are arranged in the form of a circle at the end of the cone. The polymer gels discharged from the reactor are then worked up in a customary manner, ie. they can be further divided, eg. with the aid of a cutting knife, and the comminuted gel then dried. Equipment suitable for this purpose is the customary equipment such as tumble dryers, paddle dryers, belt dryers, a stirred solid bed or a fluidized bed.

High molecular weight polymers are obtained by the process according to the invention by polymerization of water-soluble, monoethylenically unsaturated monomers and, if desired, crosslinkers which contain at least two nonconjugated, ethylenically unsaturated double bonds in the molecule, and, if desired, water-insoluble monoethylenically unsaturated monomers. If the polymerization is carried out in the absence of crosslinkers, water-soluble polymers are formed. The amount of water-insoluble monoethylenically unsaturated monomers, which, if desired, are additionally used in the polymerization, is at most so high that copolymers which are still water-soluble result. The water-soluble monoethylenically unsaturated monomers are designated in the following as monomers of group (a). Suitable monomers of this group are, for example, ethylenically unsaturated $C_3$- to $C_6$-carboxylic acids, their amides and esters with aminoalcohols of the formula

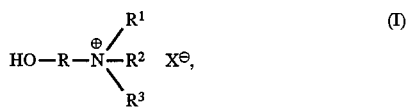

where R=$C_2$- to $C_5$- alkylene, $R^1$, $R^2$, $R^3$=H, $CH_3$, $C_2H_5$, $C_3H_7$ and $X^\ominus$ is an anion. Additionally suitable are amides which are derived from amines of the formula

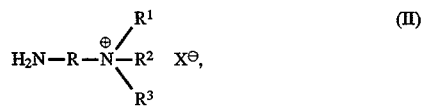

The substituents in formula II and $X^\ominus$ have the same meanings as in formula I.

These compounds are, for example, acrylic acid, methacrylic acid, crotonic acid, itaconic acid, maleic acid, fumaric acid, acrylamide, methacrylamide, crotonamide, dimethylaminoethyl acrylate, diethylaminoethyl acrylate, dimethylaminoneopentyl acrylate and dimethylaminoethyl methacrylate, dimethylaminopropyl acrylate, dimethylaminoneopentyl acrylate and dimethylaminoneopentyl methacrylate. The basic acrylates and methacrylates or basic amides which are derived from the compounds of the formula II are employed in the form of the salts with strong mineral acids, sulfonic acids or carboxylic acids or in quaternized form. The anion $X^\ominus$ for the compounds of the formula I is the acid radical of the mineral acids or of the carboxylic acids or methosulfate, ethosulfate or halide from a quaternizing agent.

Further water-soluble monomers of group (a) are N-vinylpyrrolidone, N-vinylformamide, acrylamidopropanesulfonic acid, vinylphosphonic acid and/or alkali metal or ammonium salts of vinylsulfonic acid. The other acids can likewise be employed in the polymerization either in unneutralized form or in partially or up to 100% neutralized form. Suitable water-soluble monomers of group (a) are also diallylammonium compounds, such as dimethyldiallylammonium chloride, diethyldiallylammonium chloride or diallylpiperidinium bromide, N-vinylimidazolium compounds, such as salts or quaternization products of N-vinylimidazole and 1-vinyl-2-methylimidazole, and N-vinylimidazolines, such as N-vinylimidazoline, 1-vinyl-2-methylimidazoline, 1-vinyl-2-ethylimidazoline or 1-vinyl-2-n-propylimidazoline, which are likewise employed in the polymerization in quaternized form or as a salt.

Preferred monomers of group (a) are acrylic acid, methacrylic acid, sodium or potassium acrylate, sodium or potassium methacrylate, acrylamide or dimethylaminoethyl acrylate in quaternized form or as a salt or mixtures of the monomers. These monomers can be copolymerized with one another in any desired ratio, acrylic acid partially neutralized using sodium hydroxide solution, monomer mixtures of acrylamide and acrylic acid and/or sodium acrylate and monomer mixtures of acrylamide and dimethylaminoethyl acrylate methochloride being particularly preferably employed.

In order to prepare crosslinked polymers which are used as super-absorbers, at least one monomer of group (a) is polymerized with at least one monomer of group (b). In the following, crosslinkers designated as a monomer of group (b) are those which contain at least two nonconjugated, ethylenically unsaturated double bonds. Suitable crosslinkers are, for example, N,N'-methylenebisacrylamide, polyethylene glycol diacrylates and polyethylene glycol dimethacrylates, which are in each case derived from polyethylene glycols of a molecular weight from 126 to 8500, preferably 400 to 2000, trimethylolpropane triacrylate, trimethylolpropane trimethacrylate, ethylene glycol diacrylate, propylene glycol diacrylate, butanediol diacrylate, hexanediol diacrylate, hexanediol dimethacrylate, diacrylates and dimethacrylates of block copolymers of ethylene oxide and propylene oxide, polyhydric alcohols di- or triesterified with acrylic acid or methacrylic acid, such as glycerol or pentaerythritol, triallylamine, tetraallylethylenediamine, divinylbenzene, diallyl phthalate, polyethylene glycol divinyl ethers of polyethylene glycols of a molecular weight from 126 to 4000, trimethylolpropane diallyl ether, butanediol divinyl ether, pentaerythritol triallyl ether and/or divinylethyleneurea. Preferably, water-soluble crosslinkers are employed, eg. N,N'-methylenebisacrylamide, polyethylene glycol diacrylates, polyethylene glycol dimethacrylates, pentaerythritol triallyl ether and/or divinylurea. The monomers of group (b) are only used in the preparation of water-insoluble polymers, namely in amounts from 0.001 to 5, preferably from 0.01 to 2.0, % by weight, based on the total monomers employed in the copolymerization.

The copolymerization of the monomers of groups (a) and (b) can additionally be carried out, if an alteration of the properties of the crosslinked copolymers is desired, in the presence of water-insoluble, monoethylenically unsaturated monomers, in the following designated by monomers of group (c). Monomers of group (c) are, for example, hydroxyethyl acrylate, hydroxypropyl acrylate, hydroxyethyl methacrylate, hydroxypropyl methacrylate, acrylonitrile and/or methacrylonitrile. Additionally suitable are esters of acrylic acid or methacrylic acid with monohydric alcohols containing 1 to 18 carbon atoms, eg. methyl acrylate, ethyl acrylate, propyl acrylate, isopropyl acrylate, n-butyl acrylate, isobutyl acrylate, hexyl acrylate, 2-ethylhexyl acrylate, stearyl acrylate, the corresponding esters of methacrylic acid, diethyl fumarate, diethyl maleate, dimethyl maleate, dibutyl maleate, vinyl formate, vinyl acetate and vinyl propionate. If the monomers of group (c) are used for the modification of the water-soluble or the water-insoluble polymers, they are employed in amounts from 0.5 to 20, preferably from 2 to 10, % by weight, based on the total monomers taking part in the polymerization.

If desired, the polymerization can be carried out in the presence of the customary polymerization regulators. Suitable polymerization regulators are, for example, thio compounds, such as thioglycolic acid, mercaptoalcohols, eg. 2-mercaptoethanol, mercaptopropanol and mercaptobutanol, dodecylmercaptan, formic acid, ammonia and amines, eg. ethanolamine, diethanolamine, triethanolamine, triethylamine, morpholine and piperidine.

The monomers (a) and, if desired, (b) and, if desired, (c) are polymerized in from 10 to 80, preferably from 20 to 60, % strength by weight aqueous solution in the presence of polymerization initiators. The polymerization initiators employed can be all compounds which dissociate into radicals under the polymerization conditions, eg. peroxides, hydroperoxides, hydrogen peroxide, persulfates, azo compounds and redox catalysts. The use of water-soluble initiators is preferred. In some cases it is advantageous to use mixtures of various polymerization initiators, eg. mixtures of hydrogen peroxide and sodium or potassium peroxodisulfate. Mixtures of hydrogen peroxide and sodium peroxodisulfate can be used in any desired ratio. Suitable organic peroxides are, for example, acetylacetone peroxide, methyl ethyl ketone peroxide, tert-butyl hydroperoxide, cumene hydroperoxide, tert-amyl perpivalate, tert-butyl perpivalate, tert-butyl perneohexanoate, tert-butyl perisobutyrate, tert-butyl per-2-ethylhexanoate, tert-butyl perisononanoate, tert-butyl permaleate, tert-butyl perbenzoate, tert-butyl per-3,5,5-trimethylhexanoate and tert-amyl perneodecanoate. Particularly suitable polymerization initiators are water-soluble azo initiators, eg. 2,2'-azobis-(2-amidinopropane) dihydrochloride, 2,2'-azobis(N,N'-dimethylene) isobutyramidine dihydrochloride, 2-(carbamoylazo) isobutyronitrile, 2,2'-azobis[2-(2'-imidazolin-2-yl)propane] dihydrochloride and 4,4'-azobis(4-cyanovaleric acid). Said polymerization initiators are employed in customary amounts, eg. in amounts from 0.01 to 5, preferably 0.1 to 2.0, % by weight, based on the monomers to be polymerized.

As oxidizing component, the redox catalysts contain at least one of the abovementioned percompounds and, as reducing component, for example ascorbic acid, glucose, sorbose, ammonium or alkali metal hydrogensulfite, sulfite, thiosulfate, hyposulfite, pyrosulfite or sulfide, metal salts, such as iron(II) ions or silver ions or sodium hydroxymethylsulfoxylate. The reducing component of the redox catalyst preferably used is ascorbic acid or sodium sulfite. Based on the amount of monomers employed in the polymerization, from $3 \times 10^{-6}$ to 1 mol % of the reducing component of the redox catalyst system and from 0.001 to 5.0 mol % of the oxidizing component of the redox catalyst, for example, are used. Instead of the oxidizing component of the redox catalyst, one or more water-soluble azo starters can also be used.

In the preparation of water-soluble polymers which are used, for example, as flocculating agents, the polymerization of the monomers of group (a) described above is carried out in the absence of monomers of group (b) indicated above. If desired, the monomers of group (c) can additionally be used for the modification of the water-soluble polymers.

For the preparation of water-absorbent polymers, ie. polymers which are insoluble in water but swell therein, the water-soluble monoethylenically unsaturated monomers of group (a) are polymerized with from 0.001 to 5.0% by weight, based on the total monomers employed in the polymerization, of at least one crosslinker. The crosslinkers are described above as monomers of group (b). The water-insoluble polymers can also be modified, if desired, with the monomers of group (c). Crosslinked polyacrylic acids and crosslinked polyacrylamides are especially of industrial interest as superabsorbers.

For the preparation of flocculating agents, acrylic acid partially neutralized with sodium hydroxide solution, monomer mixtures of acrylamide and acrylic acid and/or sodium acrylate and monomer mixtures of acrylamide and dimethylaminoethyl acrylate methochloride are particularly preferably polymerized. The monomers can be copolymerized with one another in any desired ratio. It is also possible to polymerize them to homopolymers, eg. homopolymers of acrylamide and homopolymers of dimethylaminoethyl acrylate methochloride.

The polymerization is carried out in each case in aqueous solution or in solvent mixtures which contain at least 50% by weight of water. Suitable water-miscible solvents are, for example, glycols such as ethylene glycol, propylene glycol and butylene glycol, and polyethylene glycols of a molecular weight of up to 4000, and methyl and ethyl ethers of glycols and polyglycols.

The polymerization of the monomers of group (a) on their own and, if appropriate, in the presence of the monomers (c) results in water-soluble polymers. The preparation of water-insoluble polymers by polymerizing the monomers of group (a) and the monomers of group (b) and, if desired, the monomers of group (c) in aqueous solution in the presence of polymerization initiators results in polymer gels. The monomers and the initiators are dissolved, for example, in stirring vessels in the aqueous medium to be polymerized. If desired, the initiators can be fed to the reactor in the form of a solution in an organic solvent. The solution of the monomers and the initiators is preferably adjusted to a temperature in the range from $-20°$ to $30+$ C. In order to remove residual oxygen from the solution of the monomers and the initiators, an inert gas is customarily passed through these solutions. Inert gases suitable for this purpose are, for example, nitrogen, carbon dioxide or rare gases such as neon or helium. The polymerization is carried out in the absence of oxygen. The solutions of the monomers and of the initiator are mixed with one another before they reach the reactor, the introduction of monomers and initiator into the tubular reactor preferably being carried out in a countercurrent of an inert gas. The polymerization can be carried out batchwise or continuously. In a batchwise procedure, the reactor shown in the figure, for example, is filled with an aqueous monomer solution and a solution of the initiator. As soon as the polymerization starts, the reaction mixture warms up depending on the selected starting conditions, such as concentration of the monomers in the aqueous solution and nature of the monomers. On account of the heat of polymerization released, the temperature of the reaction mixture rises to, for example, from 30 to 180, preferably 40° to 130° C. The polymerization can be carried out at normal pressure, under reduced pressure or even at elevated pressure. Working at elevated pressure can be advantageous in those cases when the temperature maximum to be expected in the polymerization is above the boiling point of the solvent mixture used. On the other hand, it can be advantageous especially in the preparation of very high molecular weight products to lower the maximum temperature with the aid of vapor cooling by polymerizing under reduced pressure. The tubular reactor is in most cases jacketed such that the reaction mixture can be cooled or heated as required. After completion of the polymerization reaction, the polymer gel obtained can be rapidly cooled, for example, by cooling the reactor wall.

In order to discharge the polymer gel from the tubular reactor; an inert gas is injected onto the polymer gel at the top of the tubular reactor and the gel can then be completely pushed out of the reactor at the end of the reactor after opening the shut-off element. If desired, the polymer gel can also be discharged from the reactor by injecting an inert liquid, which is preferably a precipitating agent for the polymer, at the top of the tubular reactor. In order to discharge the resulting polymer gel from the reactor, a pressure from 2 to 65, preferably from 4 to 25, bar, for example, is necessary. The pressure data relate both to an inert gas and to an inert liquid which are introduced at the top of the reactor to discharge the polymer gel. As a result of the pressure increase at the top of the reactor, the gelatinous product is discharged from the reactor in a plug flow. Plug flow in this context is understood as meaning a flow in which a uniform falling of the surface of the gel plug takes place, virtually no deformation of the surface of the gel plug occurring. In order to discharge the polymer gel from the reactor, the pressure with which the gel is transported can be reduced in one or more stages. In the figure, a pressure reduction in one stage is shown diagrammatically. The pressure reduction is carried out by suitable selection of the ratio of the diameters D1 and D2. If desired, the transport pressure can be reduced in a further or in several subsequent pressure stages. Depending on the composition of the polymer gel and on the pressure used for ejecting the gel, the gel can break down into individual particles without mechanical comminution on letting down to normal pressure. If desired, the gel coming from the reactor can be further comminuted, as indicated above, in a subsequent processing unit, dried and, if necessary, freed from residual monomers.

The polymerization is carried out adiabatically in batchwise operation. High molecular weight products are obtained by the process according to the invention. The molecular weights of the water-soluble products are above 100,000 and are preferably from $1 \times 10^6$ to $20 \times 10^6$. They have K values according to Fikentscher of from 180 to 300 (determined in 5% strength aqueous sodium chloride solution at a polymer concentration of 0.1% by weight and a temperature of 25° C). No K value can be given for the cross-linked polymers, because the crosslinked polymers do not dissolve in water or another solvent. A molecular weight determination is not possible for the crosslinked polymers.

The water-soluble polymers are used, for example, as flocculating agents in industrial and municipal sewage treatment plants, as retention agents in the production of paper and as thickeners for aqueous systems. The crosslinked polymers have a high absorption power for water and are accordingly used as superabsorbers, eg. in diapers.

The percentage data in the examples are percentages by weight if not stated otherwise. The K values of the polymers were determined according to H. Fikentscher, Zellulose-Chemie (Cellulose Chemistry), Volume 13 (1932), 58–64 and 71–74. The measurements were carried out in 5% strength by weight sodium chloride solution at a polymer concentration of 0.1% by weight, a temperature of 25° C. and a pH of 7.

The determination of the charge density was carried out according to D. Horn., Polyethylenimine—Physicochemical Properties and Application, (IUPAC) Polymeric Amines and Ammonium Salts, Pergamon Press Oxford and New York, 1980, pages 333–355.

The absorption capacity of the superabsorber for water per gram of superabsorber was determined with the aid of the teabag test. The liquid used here is a 0.9% strength sodium chloride solution. A defined amount of gelatinous, water-absorbent copolymer (1 g) is filled into a teabag, which is then closed. The dimensions of the teabag must be appropriately matched to the amount of gelatinous copolymer weighed in. The teabag is then immersed in the liquid for a specified time and then reweighed after a drainage period of 15 seconds. To calculate the absorption capacity, a blank test must be carried out in which a teabag without gelatinous, water-absorbent copolymer is immersed in the solution and the weight of the teabag is determined after the drainage period indicated above. The absorption capacity then results from the following relationship $$\text{Absorption capacity} = \frac{\text{Weight of the teabag with polymer gel} - \text{weight of the teabag in the blank test}}{\text{Weight of the polymer gel weighed in}}$$

The retention is determined as follows: The same procedure as above, only instead of drainage of the teabags centrifugation is carried out for 3 min at 1400 rpm in a centrifuge having a diameter of 230 mm.

$$\text{Retention} = \frac{\text{Weight of the teabag after centrifuging} - \text{weight of the teabag in the blank test}}{\text{Weight of the polymer gel weighed in}}$$

The loss due to washing out is determined by dispersing the water-insoluble polymer in a 0.9% strength by weight sodium chloride solution, stirring the dispersion for 16 hours, then filtering and titrimetrically determining the amount of the extracted fraction in the filtrate.

EXAMPLES

Example 1

Preparation of a Superabsorber

In a vessel designated by 1, an aqueous solution was prepared from 1362.5 g of distilled water, 8363.5 g (32.92 mol) of a 37% strength aqueous sodium acrylate solution, 789.85 g (11.0 mol) of acrylic acid, 19.43 g of trimethylolpropane triacrylate and 64.75 g of a 15% strength aqueous sodium peroxodisulfate solution. This solution was temperature controlled at 20° C. Nitrogen was passed through the solution for 20 minutes and a solution of 0.097 g of ascorbic acid in 499.9 g of distilled water was prepared simultaneously in a second vessel, likewise temperature controlled at 20° C. and nitrogen was passed through the solution for 20 minutes. After preparation of the solutions, the contents of the two vessels were injected into the reactor synchronously under a pressure of 2 bar in a nitrogen countercurrent, both solutions being mixed with the aid of a static mixer before entry into the reactor at the site designated by 3 in the figure.

The reactor had a length of 1000 mm, a tube diameter D1 of 160 mm and tapered conically at the end to a diameter D2 of 50 mm. The ratio D1/D2 was 3.2. The cone length was 320 mm and the angle α indicated in the figure in the isosceles triangle between D1 at the beginning of the conical taper and the inner cone wall was 80°.

After the mixing of the two aqueous solutions described above, the polymerization started immediately. The nitrogen flushing of the reactor was stopped and the tubular reactor was closed. The reaction mixture reached a maximum temperature of 99° C. It was allowed to cool to room temperature overnight. A nitrogen pressure of 9 bar was injected at the top of the reactor via the line designated by 4 in the figure. After opening the shut-off valve 6, it was possible to discharge all the gelatinous reactor contents without residue, the product dividing into irregularly shaped gel particles of a few centimeters diameter at the outlet from an outlet tube having a diameter of 100 mm, not shown in the figure. The solid viscoelastic, barely sticky gel thus obtained was further comminuted using a cutting knife and then dried at 70° C. in a drying oven at 20 mbar for 15 hours. The absorption capacity for water was 45 g/g of polymer; the retention 33 g of water per g of polymer. The loss due to washing out was 22%.

Example 2

Preparation of a Superabsorber

Example 1 was repeated with the only exception that the polymerization was carried out under a pressure of 8 bar. The maximum temperature of the reaction mixture reached in this case was 95° C. The consistency of the gel obtained was solid, viscoelastic and barely sticky. It was possible to discharge the polymer gel from the tubular reactor without residue under a pressure of 9 bar. The absorption capacity was 46 g of water per g of polymer, the retention 34 g of water per g of polymer and the loss due to washing out 26%.

Example 3

Preparation of a Superabsorber

Starting from the following mixture:
Vessel 1:
Distilled water: 807.7 g
Sodium acrylate solution 37% in water: 8843.4 g (35.8 mol)
Acrylic acid: 857.5 g (11.9 mol)
Trimethylolpropane triacrylate: 21.1 g
Sodium peroxodisulfate solution 15% in water: 70.3 g
Vessel 2:
Distilled water: 499.9 g
Ascorbic acid: 0.105 g
The mixture was polymerized as described in Example 2. The maximum temperature reached was 112° C. The consistency of the gel obtained was solid, viscoelastic and only slightly sticky. It was possible to discharge the product without residue at a pressure of 9 bar. The polymer had the following properties:
Absorption capacity: 44 g/g
Retention: 32 g/g
Loss due to washing out: 21%.

Example 4

Preparation of a Superabsorber

Starting from the following mixture:
Vessel 1:
Distilled water: 118.5 g
Sodium acrylate solution 37% in water: 9482.1 g (37.6 mol)
Acrylic acid: 903.2 g (12.5 mol)
Trimethylolpropane triacrylate: 22.2 g
Sodium peroxodisulfate solution 15% in water: 74.0 g
Vessel 2:
Distilled water: 499.9 g
Ascorbic acid: 0.111 g
The mixture was polymerized as described in Example 2. The maximum temperature reached was 127° C. The consistency of the gel obtained was solid, viscoelastic and only slightly sticky. It was possible to discharge the product without residue at a pressure of 9 bar. The polymer had the following properties:
Absorption capacity: 40 g/g
Retention: 27 g/g
Loss due to washing out: 17%.

Example 5

Preparation of a Superabsorber

Starting from the following mixture:
Vessel 1:
Distilled water: 1362.5 g
Sodium acrylate solution 37% in water: 8363.5 g (32.9 mol)
Acrylic acid: 789.9 g (11.0 mol)
Trimethylolpropane triacrylate: 19.4 g
Vessel 2:
Distilled water: 497.66 g
2,2'-Azobis[2-(2'-imidazolin-2-yl)propane]dihydrochloride: 2.34 g
The mixture was polymerized as described in Example 1. The maximum temperature reached was 97° C. The consistency of the gel obtained was solid, viscoelastic and only slightly sticky. It was possible to eject the product from the tubular reactor without residue at an overpressure of 9 bar. The polymer had the following properties:
Absorption capacity: 44 g/g
Retention: 34 g/g
Loss due to washing out: 18%.

Example 6

Preparation of an Anionic Flocculating Agent

Solutions were prepared from the following constituents in the two vessels 1 and 2.
Vessel 1:
Distilled water: 5454.7 g
Acrylamide solution 50% in water: 2304.0 g (16.2 mol)
Sodium acrylate solution 37.3% in water: 1737.3 g (6.9 mol)
10% strength aqueous solution of diethylenetriaminepentasodium acetate: 4.0 g
Vessel 2:
Distilled water: 498.9 g
2,2'-Azobis[2-(2'-imidazolin-2-yl)propane]dihydrochloride: 1.08 g
Both solutions were temperature controlled at 25° C. Nitrogen was passed through the solutions for 30 minutes. The contents of the two vessels were then injected synchronously into the tubular reactor described in Example 1 at an elevated pressure of 2 bar in a nitrogen countercurrent. After commencement of the exothermic reaction, the nitrogen flushing was stopped and the tubular reactor was closed. The polymerization started within a short time after mixing. The reaction mixture reached a maximum temperature of 68° C. It cooled to room temperature overnight. A solid, visoelastic, barely sticky gel was obtained. A conically tapered tube 150 mm long lined with Teflon, which at the end had an inner diameter of 10 mm, was attached to the shut-off element at the outlet of the reactor described in Example 1. It was possible to eject the gel through the nozzle having an opening of 10 mm without problems at pressures from 4 to 8 bar. No residues remained in the tubular reactor after ejection. The gel extrudates obtained were comminuted and dried in a vacuum drying oven at 50° C. The polymer had a K value of 287 and a charge density of 3.2 meq/g.

Example 7

Preparation of an Anionic Flocculating Agent

Starting from the following mixture, a further high molecular weight copolymer of acrylamide and sodium acrylate was prepared as described in Example 6.

Vessel 1:
Distilled water: 4273.9 g
Acrylamide solution 50% in water: 400.0 g (2.8 mol)
Sodium acrylate solution 37.3% in water: 4825.7 g (19.1 mol)
10% strength aqueous solution of diethylenetriaminepentasodium acetate: 0.4 g
Vessel 2:
Distilled water: 498.8 g
2,2'-Azobis[2(2'-imidazolin2-yl)propane]dihydrochloride: 1.2 g The consistency of the gel was soft, viscoelastic and not very sticky. A conically tapered tube lined with Teflon, which at the end had an inner diameter of 10 mm, was attached to the shut-off element at the outlet of the reactor described in Example 1. It was possible to eject the gel through the nozzle having an opening of 10 mm without residue at pressures between 4 and 6 bar at the inlet of the reactor. The polymer had a K value of 244 and a charge density of 9.6 meq/g.

Example 8

Preparation of an Anionic Flocculating Agent

Starting from the following mixture, a further high molecular weight copolymer of acrylamide and sodium acrylate was prepared as described in Example 6. However, after injection of the solutions into the tubular reactor a pressure of 60 mbar was set and maintained during the polymerization and the cooling phase.

Vessel 1:
Distilled water: 1244.2 g
Acrylamide solution 50% in water: 364.0 g (2.6 mol)
Sodium acrylate solution 37.3% in water: 4391.4 g (12.4 mol)
10% strength aqueous solution of diethylenetriaminepentasodium acetate: 0.36 g
Vessel 2:
Distilled water: 498.9 g
2,2'-Azobis[2-(2'-imidazolin-2-yl)propane]dihydrochloride: 1.09 g The consistency of the gel was more solid than that of the polymer described in Example 6, viscoelastic and not very sticky. A conically tapered tube lined with Teflon, which at the end had an inner diameter of 10 mm, was attached to the shut-off element at the outlet of the reactor described in Example 1. It was possible to discharge the gel through the nozzle having an opening of 10 mm without residue at a pressure of 6 bar. The polymer had a K value of 244 and a charge density of 9.6 meq/g.

Example 9

Preparation of an Anionic Flocculating Agent

Starting from the following mixture, a further high molecular weight copolymer of acrylamide and sodium acrylate was prepared as described in Example 8.

Vessel 1:
Distilled water: 2526.1 g
Acrylamide solution 50% in water: 2600.0 g (18.3 mol)
Sodium acrylate solution 37.3% in water: 871.3 g (3.5 mol)
10% strength aqueous solution of diethylenetriaminepentasodium acetate: 2.6 g
Vessel 2:
Distilled water: 499.0 g
2,2'-Azobis[2-(2'-imidazolin-2-yl)propane]dihydrochloride: 0.98 g The consistency of the gel obtained was solid, viscoelastic and not very sticky. A conically tapered tube lined with Teflon, which at the end had an inner diameter of 10 mm, was attached to the shut-off element at the outlet of the reactor described in Example 1. It was possible to discharge the gel through the nozzle having an opening of 20 mm without residue at a pressure from 6 to 7 bar. The copolymer had a K value of 284 and a charge density of 2.7 meq/g.

Example 10

Preparation of a Nonionic Flocculating Agent

Starting from the following mixture, a further high molecular weight copolymer of acrylamide and sodium acrylate was prepared as described in Example 6.

Vessel 1:
Distilled water: 5835.3 g
50% strength aqueous acrylamide solution: 3420.0 g (24.1 mol)
37.3% strength aqueous sodium acrylate solution: 241.3 g (0.9 mol)
10% strength aqueous solution of diethylenetriaminepentasodium acetate: 3.42 g
Vessel 2:
Distilled water: 498.9 g
2,2'-Azobis[2-(2'-imidazolin-2-yl)propane]dihydrochloride: 1.08 g The consistency of the gel thus obtained was solid, viscoelastic and not very sticky. A conically tapered tube lined with Teflon, which at the end had an inner diameter of 10 mm, was attached to the shut-off element at the outlet of the reactor described in Example 1. It was possible to discharge the gel through the nozzle having an opening of 10 mm without residue by injection of 5 to 7 bar of nitrogen at the inlet of the reactor through the line designated by 4 in the figure. The copolymer had a K value of 261.

Example 11

Preparation of a Cationic Flocculating Agent

Starting from the following mixture, a further high molecular weight copolymer of acrylamide and 2-trimethylammoniumethylacryLlate chloride was prepared as described in Example 6.

Vessel 1:
Distilled water: 7050.8 g
50% strength aqueous acrylamide solution: 2797.2 g (19.7 mol)
80% strength aqueous solution of 2-trimethylammoniumethyl acrylate chloride: 749.3 g (3.1 mol)
10% strength aqueous solution of diethylenetriaminepentasodium acetate: 2.80 g
Vessel 2:
Distilled water: 498.75 g
2,2'-Azobis[2-(2'-imidazolin-2-yl)propane]dihydrochloride: 1.25 g The consistency of the gel was still solid, viscoelastic and slightly sticky. A conically tapered tube lined with Teflon, which at the end had an inner diameter of 10 mm, was attached to the shut-off element at the outlet of the reactor described in Example 1. It was possible to eject the gel through the 10 mm nozzle without residue at a pressure from 5 to 7 bar. The copolymer had a K value of 262 and a charge density of 2.1 meq/g.

Example 12

Preparation of a Cationic Flocculating Agent

Starting from the following mixture, a further high molecular weight copolymer of acrylamide and 2-trimethylammoniumethylacrylate chloride was prepared as described in Example 6.

Vessel 1:
Distilled water: 6418.3 g
50% strength aqueous acrylamide solution: 2664.0 g (18.7 mol)
80% strength aqueous solution of 2-trimethylammoniumethyl acrylate chloride: 1665.0 g (6.9 mol)
10% strength aqueous solution of diethylenetriaminepenta-sodium acetate: 2.66 g Vessel 2:
Distilled water: 348.6 g
2,2'-Azobis[2-(2'-imidazolin-2-yl)propane]dihydrochloride: 1.67 g The consistency of the gel was soft, viscoelastic and slightly sticky. A conically tapered tube lined with Teflon, which at the end had an inner diameter of 10 mm, was attached to the shut-off element at the outlet of the reactor described in Example 1. It was possible to discharge the gel through the nozzle having an opening of 5 mm without residue at a pressure from 4 to 7 bar. The copolymer had a K value of 255 and a charge density of 2.9 meq/g.

Example 13

Preparation of a Cationic Flocculating Agent

Starting from the following mixture, a further high molecular weight copolymer of acrylamide and 2-trimethylammoniumethylacrylate chloride was prepared as described in Example 6. However, the mixture was ejected at a temperature of 50° C. 2 hours after reaching the maximum temperature.

Vessel 1:
Distilled water: 7501.3 g
50% strength aqueous acrylamide solution: 1998.0 g (14.1 mol)
80% strength aqueous 2-trimethylammoniumethyl acrylate chloride solution: 1248.8 g (5.2 mol)
10% strength aqueous solution of diethylenetriaminepenta-sodium acetate: 2.0 g Vessel 2:
Distilled water: 348.75 g
2,2'-Azobis[2-(2'-imidazolin-2-yl)propane]dihydrochloride: 1.25 g The consistency of the gel was soft, viscoelastic and slightly sticky. A conically tapered tube lined with Teflon, which at the end had an inner diameter of 5 mm, was attached to the shut-off element at the outlet of the reactor described in Example 1. It was possible to discharge the gel through the nozzle having an opening of 5 mm without residue at a pressure from 3 to 6 bar. The copolymer had a K value of 253 and a charge density of 3.0 meq/g.

Example 14

Preparation of a Cationic Flocculating Agent

Starting from the following mixture, a further high molecular weight copolymer of acrylamide and 2-trimethylammoniumethylacrylate chloride was prepared as described in Example 6.

Vessel 1:
Distilled water: 5999.0 g
50% strength aqueous acrylamide solution: 1000.0 g (7.0 mol)
80% strength aqueous 2-trimethylammoniumethyl acrylate chloride solution: 2500.0 g (10.3 mol)
10% strength aqueous solution of diethylenetriaminepenta-sodium acetate: 1.0 g Vessel 2:
Distilled water: 347.5 g
2,2'-Azobis[2-(2'-imidazolin-2-yl)propane]dihydrochloride: 2.5 g The consistency of the gel was soft, viscoelastic and sticky. A conically tapered tube lined with Teflon, which at the end had an inner diameter of 10 mm, was attached to the shut-off element at the outlet of the reactor described in Example 1. It was possible to discharge the gel through the nozzle having an opening of 10 mm at a nitrogen pressure from 3 to 5 bar at the inlet of the reactor. Only insignificant residues remained in the tubular reactor. The copolymer had a K value of 239 and a charge density of 3.9 meq/g.

We claim:

1. A process for preparing high molecular weight polymers, which comprises polymerizing water-soluble, monoethylenically unsaturated monomers and, if desired, crosslinkers which contain at least two nonconjugated, ethylenically unsaturated double bonds in the molecule, and, if desired, water-insoluble monoethylenically unsaturated monomers in aqueous solution in the presence of polymerization initiators in a tubular reactor which has a conical taper at the end, the ratio of the diameter of the reactor (D1) to the diameter at the end of the conical taper of the reactor (D2) being from 2:1 to 25:1 and the angle between D1 at the start of the conical taper and the inner cone wall being >45° and <90°, and removing the gelatinous reaction mixture by injection of an inert gas.

2. A process as claimed in claim 1, wherein the angle between D1 and the inner cone wall is from 65° to 85°.

3. A process as claimed in claim 1, wherein the water-soluble monoethylenically unsaturated monomers employed are acrylic acid, methacrylic acid, sodium or potassium acrylate, sodium or potassium methacrylate, acrylamide or dimethylaminoethyl acrylate in quaternized form or as a salt or mixtures of the monomers.

4. A process as claimed in claim 1, wherein the water-soluble monoethylenically unsaturated monomers are polymerized with from 0.001 to 5% by weight, based on the total monomers employed in the polymerization, of at least one crosslinker.

5. A process as claimed in claim 1, wherein the polymerization initiators employed are water-soluble azo initiators.

6. A process as claimed in claim 1, wherein the polymer gel is removed at the end of the reactor by injection of an inert gas at the entrance of the reactor at a pressure of from 2 to 65 bar.

7. A process as claimed in claim 1, wherein the polymer gel is removed at the end of the reactor by injection of an inert gas at the entrance of the reactor at a pressure of from 4 to 25 bar.

* * * * *